United States Patent Office 2,986,721
Patented May 30, 1961

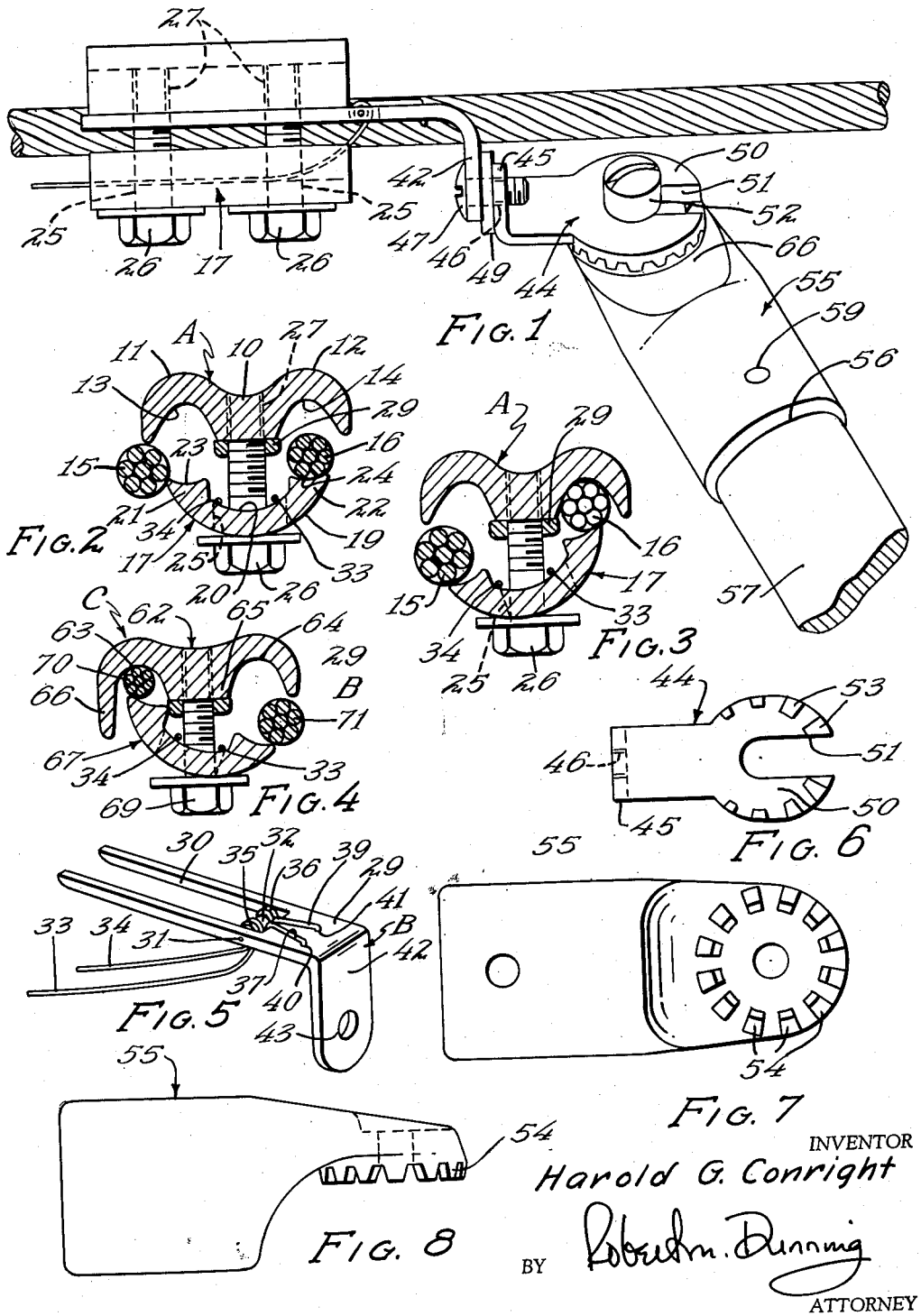

2,986,721
CLAMP HOLDING TOOL
Harold G. Conright, 1342 Breda St., St. Paul 13, Minn.
Filed Oct. 21, 1958, Ser. No. 768,676
11 Claims. (Cl. 339—109)

This invention relates to an improvement in clamp holding tool and deals particularly with a means of holding parallel grooved clamps for what is commonly known as hot stick application to high voltage cables.

Considerable difficulty is experienced in connecting two cables together where one of the cables is transmitting high voltage current and where it is impractical to cut off the current during the attachment. In such cases, it is necessary that the clamp be manipulated by means of a pole of insulation material perhaps ten feet in length. Most of the difficulty experienced in handling the clamps lies in the fact that the two parts of the clamp which are normally connected by clamping bolts cannot easily be held apart to admit the cables therebetween. Even in cases where a jumper cable is connected to the live cable and where the jumper cable may be previously inserted in the clamp, much difficulty is experienced in holding the clamp open so that the live cable may be admitted.

An object of the present invention resides in the provision of a spring device which may be attached to the end of the so called hot stick and which engages within the cable clamp to hold the two parts of the clamp spread apart. By use of such a device, the clamps may be inserted onto the cables with comparative ease and the clamping bolts may then be tightened through the use of a wrench also supported at the end of an insulation pole.

The clamps with which the present clamp holding tool is normally used are of the parallel groove type which normally include a first clamp member having a pair of parallel grooves extending longitudinally thereof in spaced relation and having one or more internally threaded openings for the accommodation of clamping bolts. The other of the members is a mating part and has cable grooves or supports designed to engage the surfaces of the cable opposite those engaged in the first clamping member and to hold the cables engaged. This clamping member normally includes transversely elongated slots for the accommodation of the shanks of the clamping bolts so that the two parts of the clamp may pivot relative to one another to permit the cables to be admitted into the grooves and also to compensate for cables of two different diameters. The heads of the clamping bolts engage against this second clamping member to urge it firmly against the first.

A feature of the present invention resides in the provision of a novel spring device for engaging between the two parts of the clamp. One part of the clamp support comprises an elongated bifurcated plate having an angularly turned extremity designed for connection to the end of the hot stick. A pivot bridges the slot between the sides of the bifurcated member and a pair of spring fingers encircle the pin and include ends which diverge away from the first part of the tool. The bifurcated plate straddles the clamping bolt or bolts and engages against one part of the clamp. The spring fingers also straddle the attaching bolts and engage resiliently against the opposite part of the clamp. These spring fingers resiliently urge the parts of the clamp apart. However, the fingers are sufficiently resilient to flex as the clamping bolts are tightened to draw the sides of the clamp together. When the clamping bolts are tight, the clamp holding tool may be withdrawn by a longitudinal movement of the tool relative to the cables engaged.

A further feature of the present invention resides in the fact that the clamp holding tool is arranged for support at virtually any angle. The angularly turned end of the tool is adjustably connected to the angularly turned end of an arm pivotally attached to the end of the insulation pole. This provides a combination of adjustments which permits the clamp to be held at any desired angle to simplify the insertion of the clamp upon the cable.

These and other objects and novel features of the present invention will be more clearly and fully set forth in the following specification and claims.

In the drawings forming a part of the specification:

Figure 1 is a side elevational view, partly in perspective, showing the manner in which the tool is supported while attaching a cable clamp to a pair of cables.

Figure 2 is a cross sectional view through the cable clamp and a pair of cables showing the general arrangement of parts therein.

Figure 3 is a view similar to Figure 2 illustrating the manner in which one part of the cable clamp may tilt relative to the other to admit a cable therebetween.

Figure 4 is a view similar to Figure 3 showing a slightly different form of cable clamp.

Figure 5 is a perspective view of the tool used to hold the clamp in spread relation.

Figure 6 is a plan view of one portion of the adjustment arm attached to the end of the insulation pole.

Figure 7 is a plan view of the socket mounted upon the end of the insulation pole and to which the adjustment arm of Figure 6 is attached.

Figure 8 is a side elevational view of the socket illustrated in Figure 7.

In the drawings, different clamp construction have been illustrated which are typical of the type of clamps with which the clamp holding tool is used. Obviously, however, these clamps may differ materially in form and the drawing is merely designed to disclose the general type of clamp with which the tool has been used. Also illustrated in the drawings is a portion of the insulation pole used in what is known as hot stick application of the clamps to cables and showing the adjustment arm which is used to support the tool. These structures are also for the purpose of illustration and so that a better understanding of the applicant's apparatus may be obtained.

The clamps with which the tool is used are designated by the letter A. The clamps illustrated are extruded bars of aluminum alloy and are shown as including a concavely grooved center portion 10 having convexly curved portions 11 and 12 on opposite sides thereof. The body is provided with grooves 13 and 14 on the side thereof opposite the convexly curved portions 11 and 12 and the grooves 13 and 14 are designed to accommodate cables such as 15 and 16. The cables 15 and 16 need not be of the same diameter as the clamp will accommodate cables of different size within quite wide limits.

The cooperable clamping plate is indicated in general by the numeral 17. The clamping plate 17 includes a rounded or convex undersurface 19 and the upper surface thereof is centrally grooved as indicated at 20 to provide opposed sides 21 and 22 having concavely grooved upper surfaces 23 and 24 respectively. The grooved upper surfaces 23 and 24 are in opposed relation to the downwardly facing grooves 13 and 14 of the upper clamping member so as to engage the undersurfaces of the cables 15 and 16 when these cables are in place.

As indicated in the drawings, the cable clamping plate 17 is provided with a pair of transversely elongated slots 25 for accommodating the shanks of clamping bolts 26. These clamping bolts 26 extend into threaded apertures 27 which are in registry with the slots 25 and extend through the central portion 10 of the upper clamping member. By tightening the clamping bolts 26, the two parts of the cable clamp may be drawn together to engage the cables 15 and 16 therebetween.

Due to the fact that the clamping bolts 26 fit loosely in the slots 25, the two parts of the clamp are not definitely held apart when the bolts 26 are loosened. As the two parts of the clamp must be spread apart to admit the cables, difficulty is experienced in applying the clamp to the cables from a remote point. Accordingly, the clamping device B, perhaps best illustrated in Figure 5 of the drawings, is employed to resiliently urge the clamping plates apart during the attachment process.

The clamp spreading device B includes a plate 29 having an elongated slot 30 extending longitudinally into the plate from one end thereof to provide a bifurcated plate end. A pivot 31 extends through the bifurcated end of the plate 29 near the base of the slot 30 and is encircled by a sleeve 32. A pair of spring fingers 33 and 34 are attached to the plate 29 to diverge therefrom when the fingers are not under compression. The fingers 33 and 34 curve away from the plate 29 at an acute angle thereto and are provided with helically wound portions 35 and 36 respectively which encircle the pivot 31 and sleeve 32. The ends 37 and 39 of the spring fingers 33 and 34 overlie the plate 29 near the base of the notch 30 and are terminally anchored into the plate 29 as indicated at 40 and 41 respectively. With this arrangement, the spring fingers normally diverge away from the bifuracted end of the plate 29 but may flex to extend generally parallel thereto. The end of the plate 29 opposite the bifurcated end is bent angularly as indicated at 42, the angularly turned end preferably extending from the same side of the plate 29 as the spring fingers 33 and 34. The angularly turned end 42 is provided with an attachment aperture 43.

An adjustment bracket illustrated in general by the numeral 44 is provided with a right angularly turned end 45 having an internally threaded aperture 46 extending therethrough. A clamping bolt 47 is designed to extend through the aperture 43 of the plate end 42 and into the threaded aperture 46 to hold the spring device B in adjusted relation to the bracket 44. A friction washer 49 may be employed to hold the two elements from relative rotation.

The bracket 44 is provided with a rounded extremity 50 which is provided with a radially extending slot 51 designed to accommodate a clamping bolt 52. As indicated in Figure 6 of the drawings, the undersurface of the plate 50 is provided with angularly spaced teeth 53 which are adjustably engageable between cooperable teeth 54 of a cooperable bracket member 55. The bracket member 55 is provided with an interior sprocket 56 designed to accommodate the end of a pole 57 of wood or insulation material. A pin or bolt 59 extends through the socket 56 and the end of the pole 57 to hold the socket in place upon the pole. The surface 60 of the bracket member 55 in which the teeth 54 are provided is substantially on a longitudinal plane through the axis of the socket as indicated in Figure 8 of the drawings.

From the foregoing description, it will be seen that the bracket 44 may be firmly attached in adjusted relation to the angularly turned end 42 of the cable clamp spreading device B and the bracket 44 may be adjustably supported on the bracket member 55 on the end of the elongated insulation pole 57. When in use, the clamp spreading device B is inserted between the two clamping plates of the cable clamp A, the bifurcated plate 29 straddling the shanks of the bolts 26 and resting against the undersurface of the central portion 10 of the upper clamping plate. The spring fingers 33 and 34 are compressed toward the plate 29 and engage in the central groove 20 of the lower clamping plate 17 on opposite sides of the clamping bolts 26. Thus, when in place, the clamping plate spreading device B resiliently urges the upper and lower plates apart to simplify the operation of the clamp A.

Due to the fact that the clamp A may be employed in a number of different ways, it is not practical to explain in detail each operation of the apparatus. For example, the clamp may be used to connect a pair of cables which are already supported in adjacent relationship or may be employed to attach a jumper cable to a main cable. Figure 3 shows one manner of operation in which the cable 16 has been inserted into the clamp and as the cable 15 is being inserted into the clamp. It will be noted that the lower clamping plate 17 has been swung or rocked in a direction to hold the cable 16 in the clamp while the opposite cable 15 is being inserted. The individual spring fingers 33 and 34 permit such rocking movement throughout the length of the transverse slot 25 in the lower clamping member 17. In other words, with the cables in the position illustrated in Figure 2, lateral force of the clamp A against the cable 15 will rock the lower clamping plate toward the position shown in Figure 3 so that the cable 15 may be admitted into the clamp. When in place, the heads of the bolts 26 are engaged by a socket wrench supported on the end of an insulated pole and the two parts of the clamp may be drawn tightly together. This clamping action may take place while the cable clamp spreading device B remains in place due to the fact that the cables are clamped in place while the center portions of the clamping plate remain slightly spread apart. As the bolts 26 are tightened, the cables are securely clamped in place and the resilient fingers 33 and 34 flex toward the bifurcated plate 29 to permit this action. When the bolts 26 are tightened, the clamp spreading device B may be withdrawn from within the clamp by a longitudinal movement of the bifurcated plate 29 until this plate and the spring fingers 33 and 34 are slid from between the clamping plates.

The structure shown in Figure 4 of the drawings is virtually identical with that previously described with the exception that the upper plate 62 of the clamp C is of slightly different form. The undersurface of the upper clamping plate 62 includes spaced longitudinal grooves 63 and 64 which are spaced by a central downwardly projecting rib 65. One side 66 of the upper clamping plate 62 extends downwardly below the level of the opposite side so that the groove 63 is in effect deeper than the groove 64. The lower clamping plate 67 is identical with the lower clamping plate 17 previously described and the two plates are held together by bolts 69 which are identical with the bolts 26 previously described.

The clamp C is designed to accommodate a pair of cables 70 and 71. This type of clamp is normally most commonly used in connecting a jumper cable to a main cable and where it is possible to insert the jumper cable 63 into the clamp at the start of the operation. The clamp C is attached to the second cable 71 in the manner previously described by merely rocking the lower clamping plate 67 relative to the upper clamping plate until the cable 71 may slide into the groove 64. When thus engaged, the spring fingers 33 and 34 tend to return the lower clamping plate to a centered position and it is possible to clamp the cables by merely tightening the clamping bolts 69.

In accordance with the patent statutes, I have described the principles of construction and operation of my improvement in clamp holding tool, and while I have endeavored to set forth the best embodiment thereof, I desire to have it understood that changes may be made within the scope of the following claims without departing from the spirit of my invention.

I claim:

1. A cable clamp spreading device for use in conjunction with a cable clamp including a pair of clamping plates including parallel grooves designed to accommodate cables and a bolt between said grooves by means of which said clamping plates may be urged together, the spreading device including a plate having spaced fingers designed to extend between said clamping plates and to straddle said bolt, and resilient finger means supported by said first named fingers and also designed to straddle said clamping bolt, whereby said resilient fingers may engage one clamping plate and said spaced fingers may engage the other clamping plate for urging the clamping plates apart.

2. The construction described in claim 1 and including an elongated pole of insulation material, and means adjustably connecting said clamping plate spreading device at various angles with respect to said pole.

3. The construction described in claim 1 and in which said spaced fingers are relatively rigid.

4. A spreading device for use in conjunction with cable clamps having a pair of clamping plates including parallel grooves designed to accommodate cables between said clamping plates, and including a bolt between said grooves adjustably connecting said plates, the tool including an elongated body including a pair of generally parallel fingers designed to engage against the inner surface of one clamping plate and to straddle said bolt, and a pair of resilient fingers secured to said body and designed to normally diverge away from said first named fingers, said resilient fingers being engageable against the other of said clamping plates and to straddle said bolt, and handle means on said body for manipulating the device during its use.

5. The construction described in claim 4 and in which said last named means includes an angularly turned end on said body having a bolt receiving aperture extending therethrough.

6. The construction described in claim 4 and in which said resilient fingers include helically wound portions which are axially aligned in a direction transverse to the first named fingers for causing said resilient fingers to normally diverge away from said first named fingers.

7. A cable clamp spreading device for use in conjunction with a cable clamp having a pair of opposed clamping plates having spaced parallel cable receiving grooves on the inner surface of at least one of said plates, and a clamping bolt connecting said plates between said grooves, the spreading device including an elongated plate having a bifurcated end designed to straddle said clamping bolt and to engage against the inner surface of one of said clamping plates, and a pair of resilient fingers secured to said elongated plate and positioned to diverge therefrom from the base of the slot between the bifurcated ends of said plate, said resilient fingers being designed to straddle said clamping bolt and to engage against the other clamping plate.

8. A cable clamp spreading device for use in conjunction with cable clamps including a pair of opposed clamping plates having spaced parallel grooves in the inner surface of at least one of said plates and having a clamping bolt connecting said plates between said grooves, the spreading device including an elongated plate having a central longitudinal slot therein to provide a bifurcated plate end, a transverse member bridging said slot near the base thereof, said bifurcated end being designed to engage against the inner surface of one of said clamping plates and to straddle said clamping bolt, a pair of resilient fingers including helical portions encircling said member bridging said slot and extending longitudinally of said elongated plate, said helical portions causing said resilient fingers to normally assume a diverging relationship with said elongated plate, said resilient fingers being designed to straddle said clamping bolt and to engage against the other of said clamping plates to resiliently urge the clamping plates apart.

9. In combination, a cable clamp including a pair of clamping plates including parallel grooves and bolt means between said grooves for urging said plates towards each other, a pair of cables received in said grooves for retention by said plates when said bolt means is tightened sufficiently, and a removable spreading device including a first pair of spaced fingers engaging one of said plates intermediate the grooves of said one plate and said bolt means, and a second pair of spaced fingers engaging the other of said plates intermediate the grooves of this other plate and said bolt means, said first and second pairs of fingers being biased apart so as to urge said plates apart but sufficiently yieldable so as to permit tightening of said bolt means.

10. The construction described in claim 9 in which said second pair of fingers are more resilient than said first pair of fingers.

11. The construction described in claim 9 in which said first pair of fingers reside in one plane and said second pair of fingers reside in a second plane forming an acute angle with the plane of said first pair of fingers when said spreading device is removed from its engaged relation with said clamping plates.

References Cited in the file of this patent

UNITED STATES PATENTS

| | | |
|---|---|---|
| 678,898 | O'Carroll | July 23, 1901 |
| 1,111,380 | Hanke | Sept. 22, 1914 |
| 1,166,735 | Annis | Jan. 4, 1916 |
| 2,095,137 | Johnson | Oct. 5, 1937 |
| 2,438,504 | Hubbard | Mar. 30, 1948 |
| 2,898,573 | Lamb | Aug. 4, 1959 |